United States Patent
Wirtz, II et al.

(10) Patent No.: US 11,453,050 B2
(45) Date of Patent: Sep. 27, 2022

(54) BATTERY MACHINE TOOL SYSTEM AND METHOD

(71) Applicant: Wirtz Manufacturing Company, Inc., Port Huron, MI (US)

(72) Inventors: John W. Wirtz, II, Fort Gratiot, MI (US); Scott Mercurio, Clyde, MI (US); Robert N. Wirtz, Royal Oak, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 43 days.

(21) Appl. No.: 17/043,994

(22) PCT Filed: Apr. 16, 2019

(86) PCT No.: PCT/US2019/027613
§ 371 (c)(1),
(2) Date: Sep. 30, 2020

(87) PCT Pub. No.: WO2019/209578
PCT Pub. Date: Oct. 31, 2019

(65) Prior Publication Data
US 2021/0031261 A1 Feb. 4, 2021

Related U.S. Application Data (60) Provisional application No. 62/663,645, filed on Jul. 27, 2018.

(51) Int. Cl.
*H01M 4/139* (2010.01)
*H01M 4/84* (2006.01)
(Continued)

(52) U.S. Cl.
CPC ......... *B22D 25/04* (2013.01); *B23D 36/0066* (2013.01); *H01M 4/139* (2013.01);
(Continued)

(58) Field of Classification Search
CPC ........ H01M 4/139; H01M 4/84; H01M 10/04; B22D 25/04
See application file for complete search history.

(56) References Cited

U.S. PATENT DOCUMENTS

| | | |
|---|---|---|
| 2,669,376 A | 2/1954 | Winkel |
| 5,611,128 A | 3/1997 | Wirtz |

(Continued)

FOREIGN PATENT DOCUMENTS

| | | |
|---|---|---|
| EP | 1782719 A1 | 5/2007 |
| EP | 1781719 B1 | 12/2009 |

OTHER PUBLICATIONS

Supplementary European Search Report dated Feb. 22, 2021 for EP. App. No. 19793748.5 (8 pages).
(Continued)

*Primary Examiner* — Kenneth J Douyette
(74) *Attorney, Agent, or Firm* — Reising Ethington P.C.

(57) ABSTRACT

A system for setting a specific value of a variable operating parameter of a machine usable with a plurality of different tools each requiring a different specific value of the operating parameter. The system may include a tag associated with a specific tool and containing stored data of a predetermined desired value of an operating parameter of the machine for the specific tool, a reader of the tool stored data of the desired value and a controller of the machine which uses at least some of the stored data to set the predetermined desired value of the variable operating parameter of the machine for its use of the specific tool or of a variable operating parameter of another machine which is dependent on the specific value of at least some of the stored data of the tag of the specific tool used in the machine. The machine may be one of a battery grid casting machine, a battery grid pasting machine, a battery paste making machine, a battery (Continued)

paste drying oven, a battery grid or plate cutting or trimming machine, a battery plate stacking machine, a robotic palletizing machine, or the like.

18 Claims, 6 Drawing Sheets

(51) Int. Cl.
  *H01M 10/04* (2006.01)
  *B22D 25/04* (2006.01)
  *B23D 36/00* (2006.01)
  *H01M 4/72* (2006.01)
  *H01M 4/88* (2006.01)
(52) U.S. Cl.
  CPC .............. *H01M 4/72* (2013.01); *H01M 4/84* (2013.01); *H01M 4/8875* (2013.01); *H01M 10/0404* (2013.01)

(56) References Cited

U.S. PATENT DOCUMENTS

| | | |
|---|---|---|
| 2008/0061938 A1 | 3/2008 | Osterholt et al. |
| 2010/0201489 A1* | 8/2010 | Griffin ............... G06F 21/6245 340/10.1 |
| 2010/0277283 A1 | 11/2010 | Burkart et al. |
| 2011/0078979 A1 | 4/2011 | Hutter |
| 2014/0184397 A1 | 7/2014 | Volpert |
| 2016/0285883 A1 | 9/2016 | Sawa et al. |
| 2016/0288154 A1 | 10/2016 | Mendoza et al. |
| 2017/0341163 A1 | 11/2017 | Mendoza et al. |

OTHER PUBLICATIONS

PCT/US2019/027613 International Search Report and Written Opinion dated Jul. 10, 2019 (Jul. 10, 2019).
European Office Action for European Application No. 19793748.5-1103 dated Dec. 7, 2021 (6 pages).
Indian Office Action for Indian Application No. 202037045676 dated May 11, 2022 (13 pages).

* cited by examiner

BATTERY MACHINE TOOL SYSTEM AND METHOD

REFERENCE TO RELATED APPLICATIONS

This application claims the benefit of U.S. Provisional Application Ser. No. 62/663,645 filed on Apr. 27, 2018, the entire contents of which are incorporated herein by reference in its entirety.

TECHNICAL FIELD

This disclosure relates generally to machines and production lines for making components for batteries and more particularly to a system and method for setting machine and production line values of variable operating parameters for a specific tool used therein.

BACKGROUND

Many machines and lines for producing battery components such as electrodes, grids, paste for electrodes and grids, application of paste to electrodes or grids, drying pasted grids, stacking them, etc. are capable of using a plurality of different tools and have at least some operating parameters the values of which can be varied and must be set for the specific tool to be used in the machine or line. The machine or line typically has an electronic controller of the variable operating parameters and an operator must enter different values for at least some of the variable operating parameters for each different tool to be used in the machine or line for a production run. Entry of these values by an operator for a specific tool is time consuming and dependent on the operator accurately doing so, and thus on occasion results in an error which may damage the tool, result in loss production and scrap material and in some instances damages the machine or production line.

SUMMARY

A system, machine and/or method of setting specific values of at least one variable operating parameter of a machine or production line capable of using a variety of different tools for providing and/or assembling at least one component of lead acid batteries. In some applications, a tag or label associated with a specific tool may contain stored data of a specific value of one or more operating parameters of the machine or production line in which it is used which store data may be read by a reader of and used by an electronic controller of the machine or production line to automatically set such specific value for operation of the machine or line with which the tool is used. In some applications each different tool with which a machine or line may be used may have a separate associated tag or label containing specific values of one or more variable parameters of the machine or line with which it is used.

In some implementations, the label or tag of a tool may have all of the data and information needed for proper programming and operation of the machine in which it is used and/or for synchronization of any other machine or line dependent upon the component produced by the machine or line using the specific tool. In some implementations, the tag for a specific tool may be a radio frequency identification (RFID) tag and a RFID reader may read the data of such tag and an electronic controller may use such data to set a specific value of at least one variable operating parameter of the machine or line needed for proper use of such tool. In some implementations, the tag of a specific tool may also receive and store data regarding its actual use. In some implementations, such received and stored data of actual use may be useful for service, repair and for replacement of such tool and/or maintenance and repair of the machine or line using such tool. In some implementations, the machine or line may be a battery grid caster, grid cutter or trimmer, grid paster, paste maker, drying oven, a plate stacker, robotic palletizer, assembly line plate assembler, post caster, lug welder, etc.

BRIEF DESCRIPTION OF THE DRAWINGS

The following detailed description of certain embodiments and best mode will be set forth with reference to the accompanying drawings, in which.

DETAILED DESCRIPTION

Figure 1:
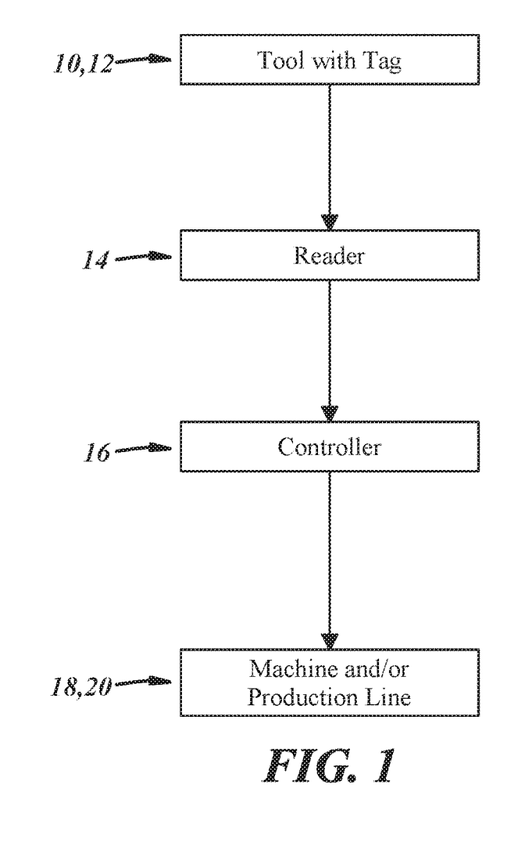
FIG. 1 is a flow chart of a method and system for a tool with a tag containing data for setting up a machine or production line for use of the tool.

Each of the disclosed systems and machines is capable of using a plurality of different tools for producing a variety of lead acid battery components of different configurations or sizes with a controller setting specific values of variable operating parameters for use with each of a plurality of different tools. As shown in FIG. 1, each different or specific tool 10 may have a label or tag 12 such as a radio frequency identification (RFID) tag containing stored data of the values of the variable operating parameters of the machine and/or line which the specific tool requires for a production run. A reader 14 of the tag such as an RFID reader may read the data of the tag of the specific tool and an electronic controller 16 such as a microprocessor or a PLC may use the data to set the value of one or more of the operating parameters of the machine needed for proper use of the tool in the machine 18 and/or a production line 20 which includes the machine and/or operations upstream or downstream of the machine which are dependent on the specific tool being used by the machine. As or when a specific tool is installed on a machine the reader may read the label or tag carried by or associated with the specific tool and may input data to the controller for the controller to adjust the specific values of the variables of the machine or line needed for proper operation and use of the specific tool. The label or tag of each tool may have the data and information needed for the proper programming and operation of the machine in which it is used and for synchronization of any line or other machine dependent upon the specific tool or the component produced by the machine using the specific tool. If desired, the tag for each tool could also receive and store information and data regarding its use which may be desirable for maintenance of the tool and/or machine such as the number of hours of use of the tool.

Figure 2:
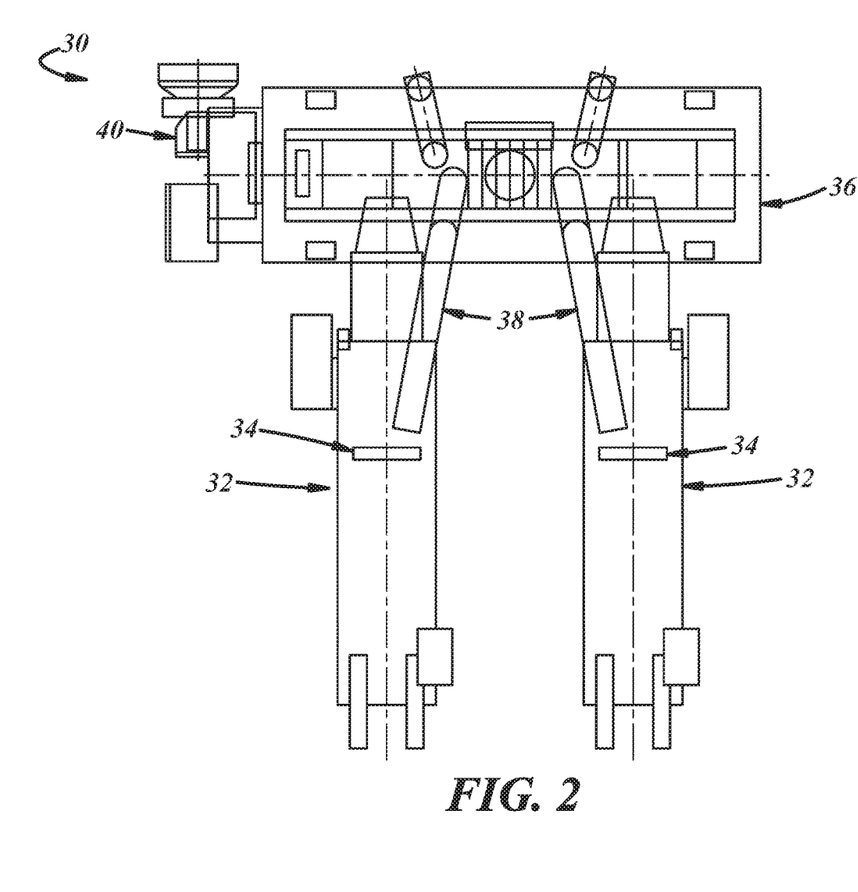
FIG. 2 is a top view of a line and machines for gravity casting in molds grids for a lead acid battery.

As shown in FIG. 2, a battery grid gravity casting line 30 may include one or more grid casting machines 32 with molds 34 (tooling) to which molten lead is supplied from a furnace 36 through dispensing channels 38. The furnace may include pumps and control gates for delivering a metered quantity of molten lead to each mold 34 of each casting machine and a temperature controlled gas combustion burner assembly 40 to melt the lead and maintain the molten lead at a desired temperature. The molds may include temperature controlled electric heating elements and cooling passages, and downstream thereof a temperature controlled bath of cooling water through which the cast grids are passed to rapidly cool them. The grids may also be transferred to a downstream grid trimmer 42 and then to a stacking machine which may need values of variable operating parameters such as the specific size, thickness, configuration, and/or weight of the grids cast in a specific mold tooling.

This casting machine and casting line may be used with a wide variety of different molds 34 each configured to produce a grid of a different size, thickness, weight, perimeter configuration and/or wire configuration. A suitable mold design is disclosed in U.S. Pat. No. 4,079,911 of this application and the disclosure of which is incorporated herein by reference. The tag for each mold tooling assembly may include data for the desired quantity of molten lead to be dispensed to each mold for each grid cast, a predetermined desired temperature range of the molten lead, the mold heating and coolant temperatures, the needed size and configuration dimensions of the cast grid for the trimmer, the predetermined desired temperature of the water cooling bath through which the grids pass, the speed at which the mold will produce a cast grid which may be in the range of 10-20 grids per minute, the speed at which the various transfer conveyors should operate, and any other data specific to the mold to be used which is needed to properly control and synchronize operation of the casting machine, furnace, molten lead, mold heaters, cooling system, etc. Some or all of this data needed for the casting machine and line to properly use a mold may be stored on the tag associated with the mold.

When the mold is installed in a casting machine, the reader reads this data and typically provides it to the casting machine and/or line electronic controller(s) such as a microcontroller or a programmable logic controller (PLC) which in use controls operation of the casting machine, and other portions of the line when in use to cast battery grids.

Figure 3:
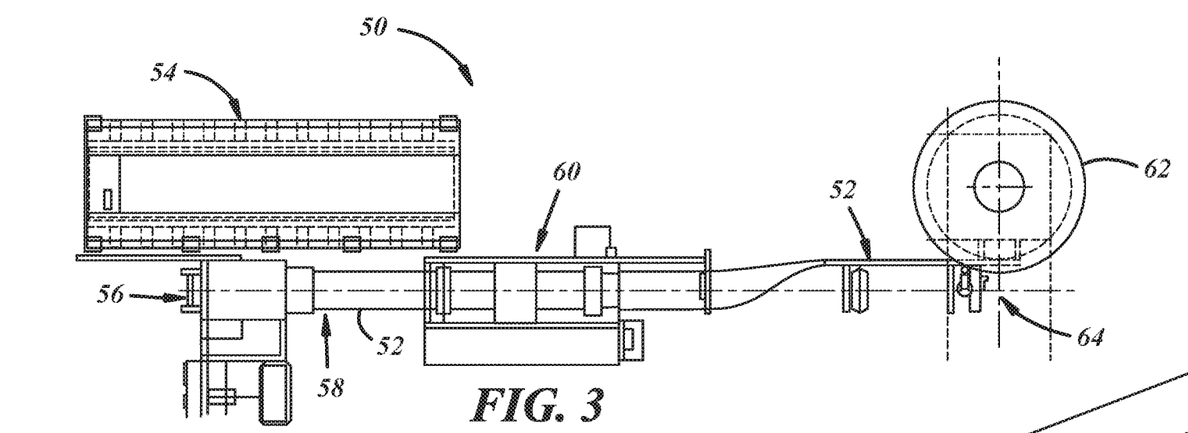
FIG. 3 is a top view of a line and machine for continuously casting a strip of a plurality of connected grids for a lead acid battery.
Figure 4:
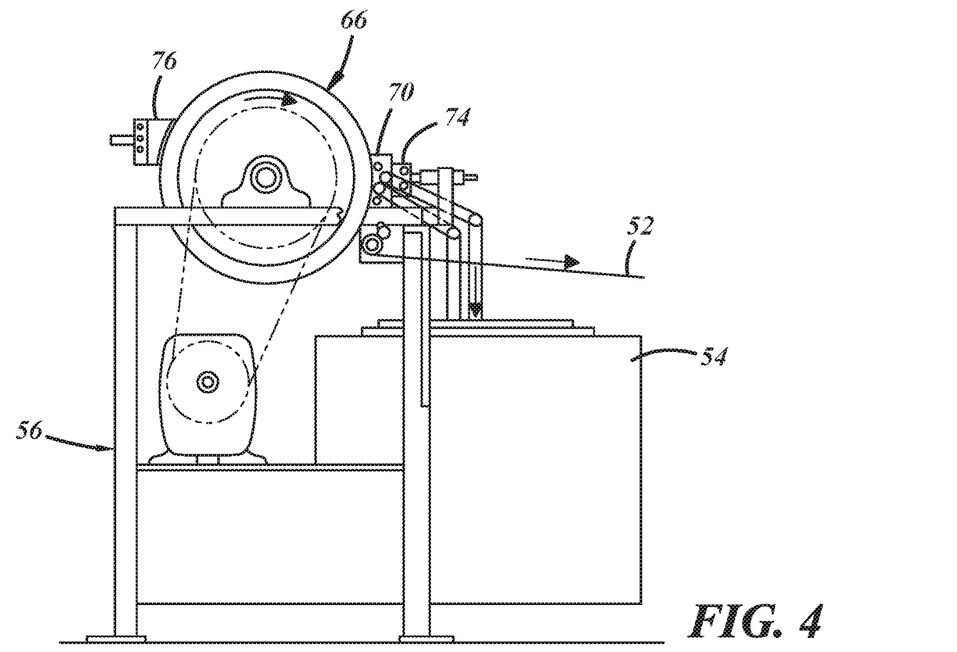
FIG. 4 is a side view of a machine for continuously casting battery grids.
Figure 5:
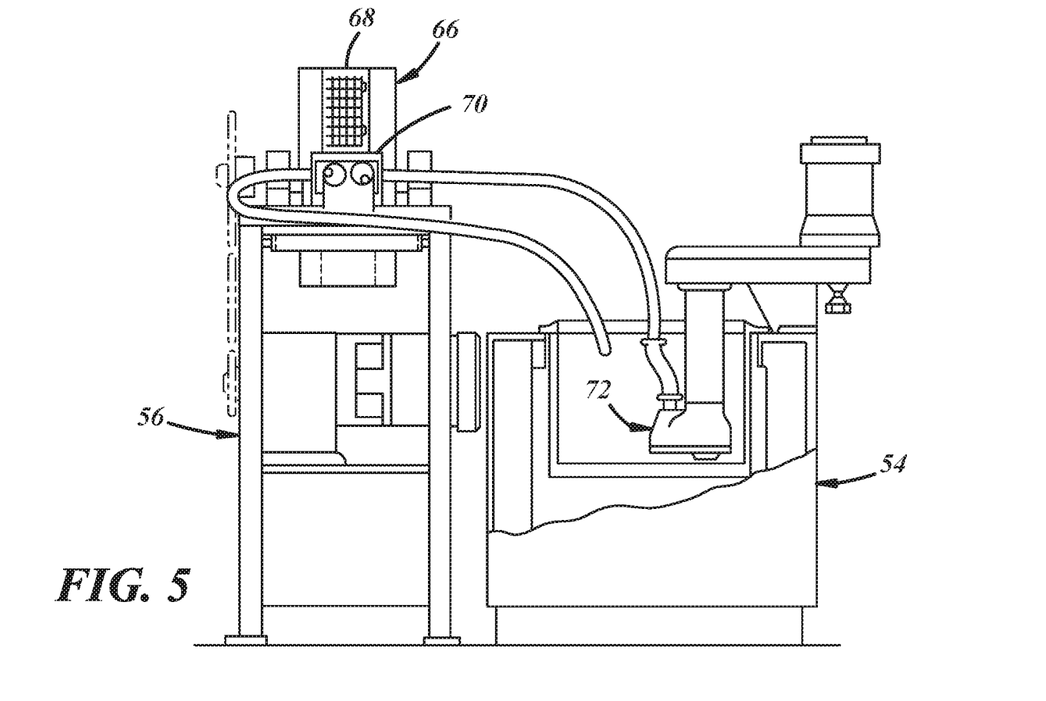
FIG. 5 is an end view of the continuous grid casting machine of FIG. 4.
Figure 6:
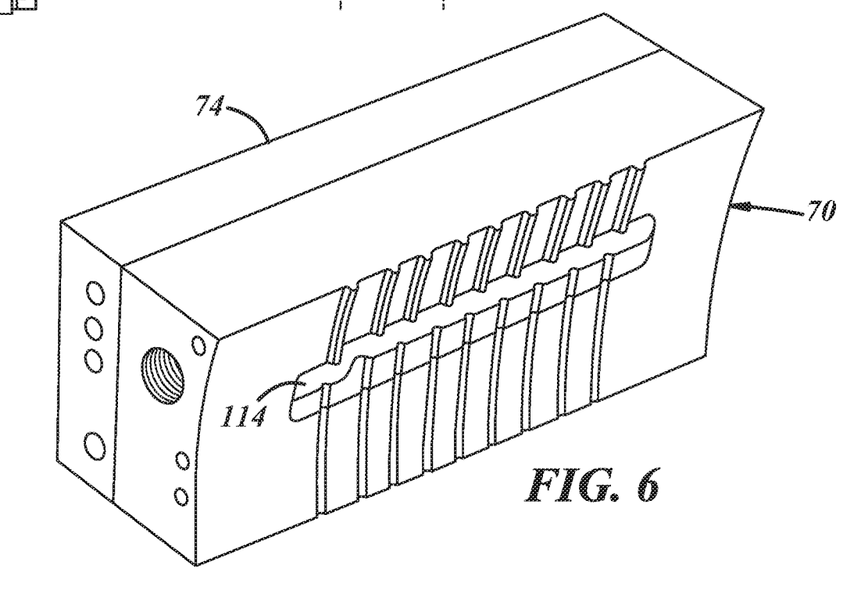
FIG. 6 is an isometric perspective view of a shoe of the grid casting machine of FIG. 4.

FIG. 3 illustrates a production line 50 for casting an elongate continuous strip 52 of a plurality of connected battery grids of lead or a lead alloy. The line may include a furnace 54 for melting the lead and maintaining a desired temperature of the molten lead, a continuous casting machine 56, a conveyor belt system 58, a grid strip take off system 60 downstream of the casting machine which may rotate the strip 90 degrees so that it may be coiled on a reel 62 in a strip coiling machine 64. As shown in FIGS. 4-6 the casting machine 56 may include a rotary cylindrical drum 66 with an outer peripheral surface with a series of grid mold cavities 68 therein of a predetermined desired configuration, and a complimentary arcuate shoe 70 through which molten lead is supplied by a pump 72 to the cavities as the drum rotates. Typically, the shoe 70 or its mounting block 74 contains temperature controlled electric heating elements and on the opposite side of the drum a series of temperature controlled water spray nozzles 76 which spray water onto the drum to cool it. Different drums produce a continuous strip with grids which may be of a different size, wire configuration, thicknesses, and may be rotated at different speeds.

Each specific drum 66 and associated shoe 70 typically may require a different shoe temperature, drum cooling temperature, rotary speed, molten lead temperature, circulation rate of molten lead to and through the shoe, etc. The different rotary speeds of different drums typically require the grid strip take off system 60 and the grid coiling machine 64 to operate at different speeds. A separate tag with each rotary drum may contain some or all of this data and the shoe 70 may also have a separate tag identifying the specific drum or drums with which it may be used. A reader with the machine and production line may be used with a wide variety of different drums having different cavity configurations and associated shoes. When a specific shoe and associated drum are installed in the casting machine a reader may read and use the data from the drum tag or the drum tag and associated shoe tag to automatically program a electronic controller(s) of the machine and/or the machine and line such as one or more PLCs of the machine or machine and line with the specific values needed for the variable operation parameters of the machine or machine and line needed for proper and usually optimum use of the specific rotary drum and shoe tooling for the production of a continuous strip of a plurality of cast battery grids, and usually the winding of this strip on a rotatable spool or reel in the coiling station downstream of the casting machine. The continuous casting machine may be the type disclosed in U.S. Pat. No. 4,509,581 assigned to the company applicant of this application and the disclosure which is incorporated herein by reference.

Figure 7:
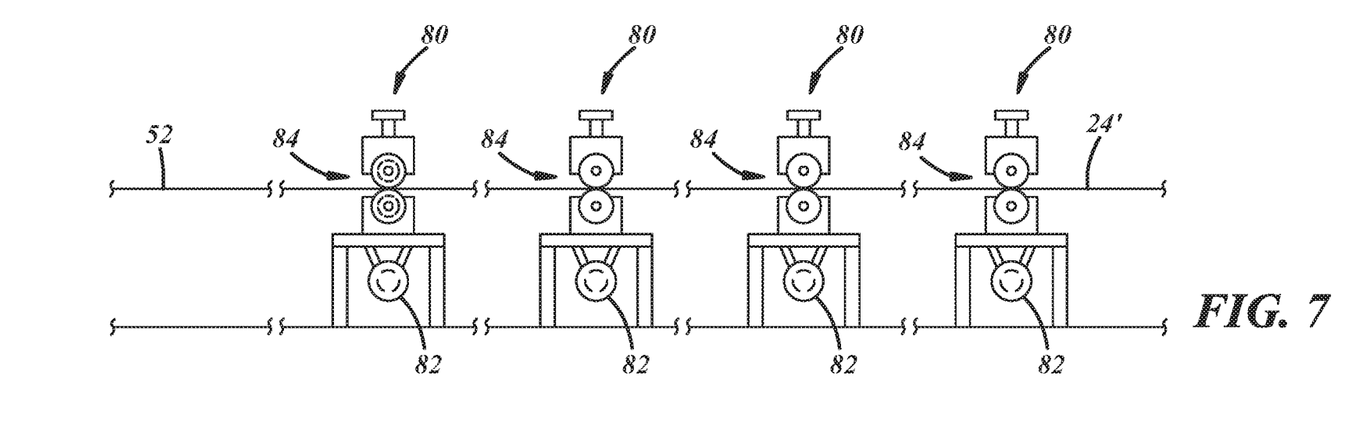
FIG. 7 is a side view of a line for cold working a strip of continuous cast battery grids.

As shown in FIG. 7, the tensile strength of the grids of the strip 52 may be significantly increased and the microstructure of the grids changed to increase their corrosion resistance by cold working the strip to reduce its cross-sectional thickness by passing the strip through a series of compression roller machines 80 each driven by a separate variable speed motor 82. Typically, due to the reduction of thickness and slight elongation of the strip produced by each roller machine 80 each succeeding roller machine is driven at a somewhat different speed which typically requires the rollers 84 in each succeeding machine to be driven at a somewhat higher peripheral speed equal to the lineal surface speed of the strip as it enters each roller machine. The rotary speed programmed into the tag for each drum used in the casting machine may also be read and used by a microprocessor or PLC to determine the speed at which the rollers 84 in each roller machine are driven or the speed at which the rollers are driven may be programmed into the tag of the specific drum tool and provided by the reader to the PLC or other controller for the roller machines. Desirably the roller machines may be located directly downstream of the continuous casting machine to receive the strip from it and desirably upstream of the coiling machine.

Figure 8:
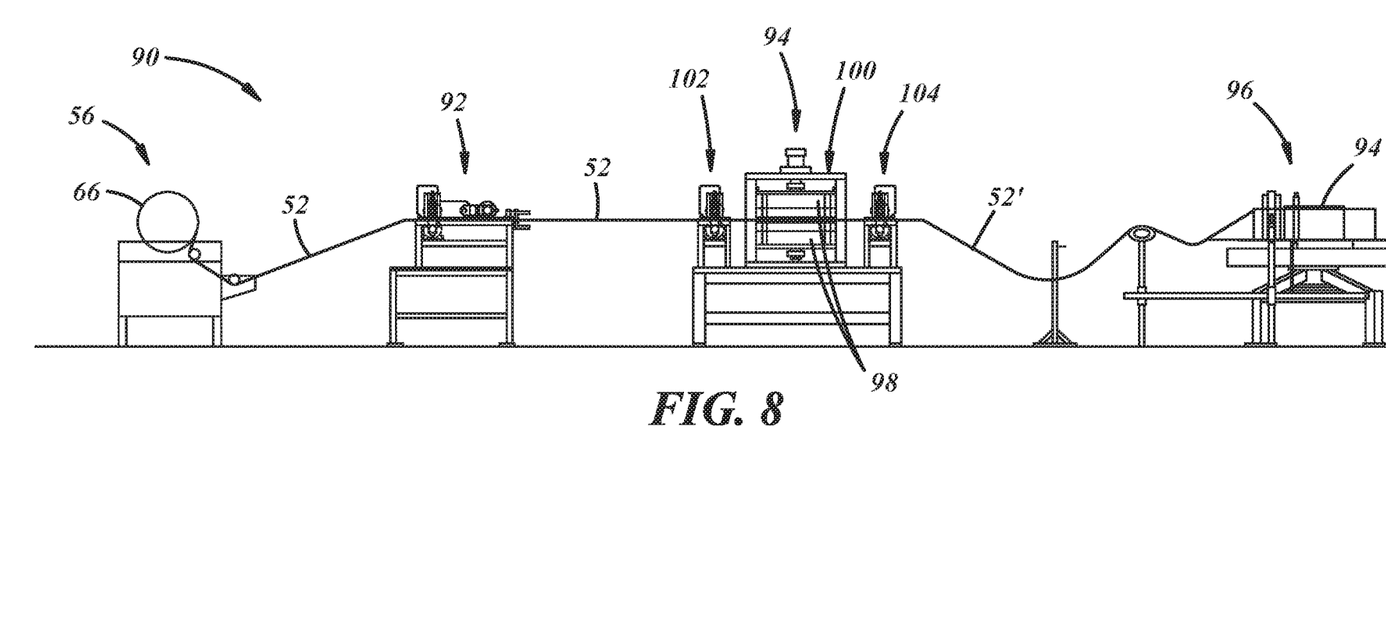
FIG. 8 is a side view of a line and machine for die punch forming a continuous strip of a plurality of connected grids for a lead acid battery.

Adhesion of cured battery paste (active material) to the grids and thus battery plates can be improved by changing the cross-sectional shape of the grid wires to form lands thereon inclined to the plane of the grid and by forming a textured surface on the lands of the wires of the grid. As shown in FIG. 8, a production line 90 to change the cross-sectional shape of the grid wires of an elongate continuous strip 52 of cast grids may include a strip driving machine 92 receiving the continuous strip from a continuous casting machine 56 and conveying this strip to a grid reforming machine 94 and the reformed strip 52' may be coiled on a reel 94 received in a downstream coiling machine 96. The grid reforming machine 94 may include reforming dies such as stamping dies 98 received in a press 100 or a pair or suitable rotary dies through the nip of which the strip passes to change the cross-sectional shape of the grid wires. These stamping or rotary dies may also form a textured surface on the lands of the reshaped grids. The reforming machine may include entrance and exit feed rollers 102,104 upstream and downstream of the dies to move the strip through the dies. The operating speeds of the strip driving machine 92, the reforming machine 94, the feed entrance and exit rollers 102,104, the reforming dies 98 of the reforming machine 94, and the coiling machine 96 are all dependent on the speed of rotation of the drum 66 of the casting machine 56. Also, each drum with a different mold cavity grid configuration must be used with a different set of compatible reforming dies 98. Thus, the complimentary reforming dies 98 may include an associated label or tag cooperating with a reader and a controller of the reforming machine which may also receive data from the reader of the tag of the casting drum 66 to determine if the right set of drum and reforming dies has been installed in the casting and reforming machines. If so, the tag of either the drum or the complimentary reforming dies may also provide any necessary data for a microcontroller or PLC to control the speed, registration and any other specific data needed for proper registration and operation of the reforming machine and its die tooling. A production line and method for reforming grid wires of a continuous strip is disclosed in U.S. Pat. No. 8,875,361 assigned to the applicant company of this application and the disclosure of which is incorporated herein by reference.

A continuous elongate strip of a plurality of battery grids also can be made by punching out portions of a solid strip of lead or lead alloy to form connected grids with each grid having a plurality of spaced apart wire segments with a generally rectangular cross-section and interconnected at nodes and with open spaces between the wire segments. This continuous strip of grids may be made with a progressive punching die. The punching die for forming this continuous strip of grids may be provided with an associated tag with the data needed to cycle and control the die and press making this continuous strip of grids. The tag for each different set of these punching dies may also include the data for a downstream reforming machine 94, its dies 98 and any downstream equipment whose proper function is dependent on the configuration and/or length of the grids of the strip and/or the speed at which it emerges from and moves downstream of the punching dies forming this strip.

Figure 9:
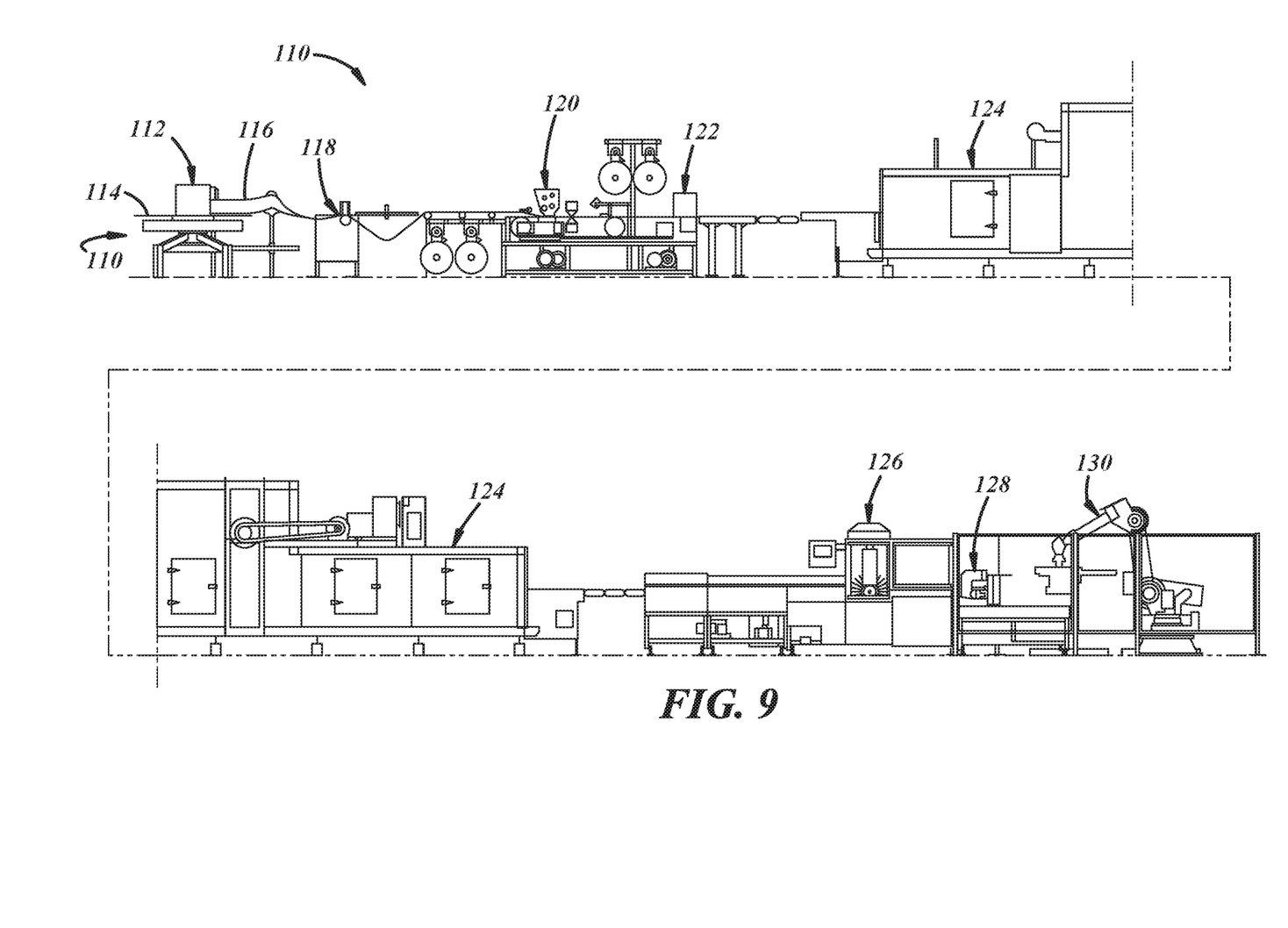
FIG. 9 is a side view of a battery grid pasting and processing line.

Battery paste (active material) may be applied to a continuous strip of grids by a pasting machine which typically may be part of a production line 110 which downstream further processes the pasted strip of grids such as the production line shown in FIG. 9. The production line may have in succeeding downstream stations an uncoiler 112 of a reel 114 of a coiled continuous strip 116, a pick up and feed roller 118, a pasting machine 120, a cutter 122 to sever the strip into individual grids, a flash drying oven 124, an indexing carousel 126, a pasted plate stacker 128, and a robot 130 placing stacks of the separate pasted plates on a pallet for subsequent processing in the overall manufacture and assembly of making batteries. This production line 110 and various forms of paster machines are disclosed in U.S. Pat. No. 9,397,331 assigned to the company applicant of this application and the disclosure of which is incorporated herein by reference.

Figure 10:
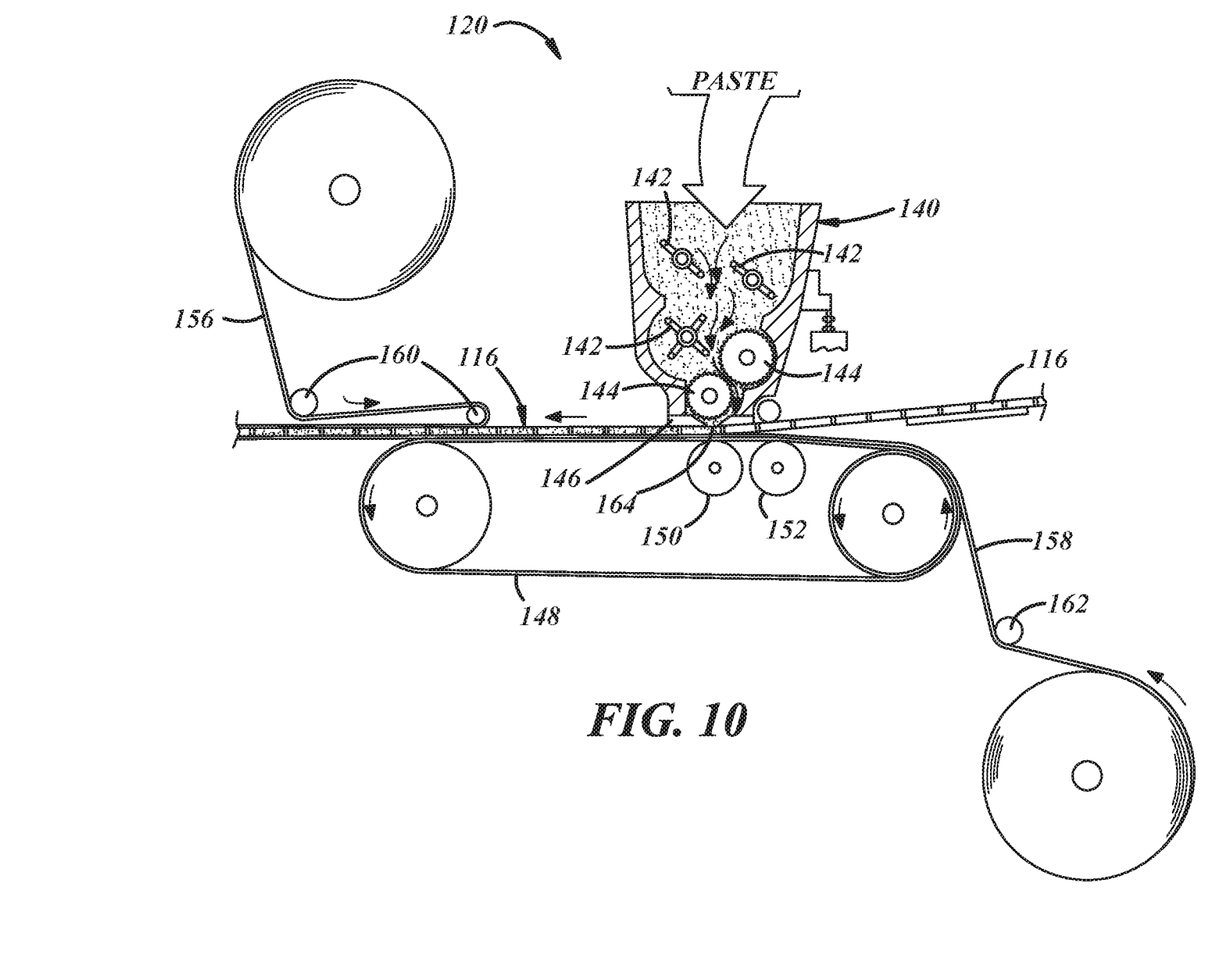
FIG. 10 is a diagrammatic side view of a battery grid pasting machine.

One suitable pasting machine 120 is diagrammatically shown in FIG. 10 and may have a paste hopper 140 with paddle wheels 142 and feed rollers 144 therein which in operation are driven by a variable speed electric motor to dispense paste through an orifice plate 146 onto and between the wires of the grids of the continuous strip 116 as it is advanced under the hopper plate by a conveyor belt 148. Rollers 150,152 under the upper run 154 of the conveyor belt may be moved generally vertically relative to the orifice plate 146 such as by a stepper motor to control the extent to which the continuous strip 116 of grids may be over pasted so that the total thickness of the paste is greater than the thickness of the wires of the grids in the strip. To prevent the paste from sticking to downstream processing equipment and stacked pasted grids from sticking to each other, paper 156,158 may be applied to both faces of the pasted strip by a suitable arrangement of rollers 160,162 which if desired may be driven by a variable speed motor to dispose the paper onto opposed faces of the pasted grid strip at the rate at which the strip of grids is advanced under the paste hopper.

Continuous strips of grids having different configurations, width, and/or thickness usually may require an orifice plate having a somewhat different orifice 164 configuration. Thus, each different orifice plate 146 may be provided with a tag which may include data for the desired speed of operation of the paddle wheels 142 and feed rollers 144 of the paste hopper, the position of the movable roller 150 at least in part adjusting the thickness of the paste applied to the grid wires of the strip 116, the speed at which the conveyor belt 148 advances the continuous strip under the hopper 140, etc. If desired, each reel 94 of a continuous strip having a different grid configuration, length, width, or other characteristic affecting pasting may also have a tag identifying the strip. An associated reader upstream of the paster 120 which typically may be in the loading station of the uncoiler 112 may read this tag to provide data to determine whether the correct paster orifice plate tooling has been installed for the strip of grids to be pasted. If not, an associated PLC may inhibit use of the paster 120 until the correct orifice plate or a reel of strip has been installed. A visual and/or audible error signal also may be actuated by the controller.

The paster orifice plate tag may also include data of the speed and other relevant operating parameters for the processing equipment downstream of the paster. For example, this tag may include data for one or more of the downstream equipment or processing such as the speed of operation of the cutter 122 to sever or cut the pasted strips into individual pasted battery grids or plates, the speed and operating temperature of the flash drying oven 124, the speed and any other relevant operating parameters of the carousel 126 arranging and spacing apart the separate pasted plates for stacking, the speed and operation of the stacker 128, and the operation of the robot 130 for placing stacks of the individual pasted plates on a palette. The orifice plate tag or the reel plate tag may also identifying the specific grid strip may also include data for the predetermined desired composition of the paste supplied to the paste hopper and/or the relevant operating parameters of a mixer of the constituent for a batch of paste. If desired, the paste mixer data may include the data needed for an automated system supplying the various constituents to the paste mixing machine for making a batch of battery paste.

Each different tool for making, pasting, or other processing of battery grids may have an associated tag containing data which through associated readers communicating with suitable microprocessors or PLCs may automatically set up and program machines and/or production lines which will use the specific tooling to make, paste, and/or process battery grids and battery plates. This use of a variety of different tooling each with a tag containing relevant data for correctly setting up the operation of machines and/or production lines using such specific tooling may have none, one or more of the significant practical advantages of essentially eliminating operator set up error, identifying installation of incorrect combinations of tooling, expediting and significantly decreasing the time required to correctly set up a machine and/or production line for using specific tooling, essentially avoiding damage to tooling, machines, and/or production lines due to the installation of incorrect tooling and/or incorrect set up of machines and lines for using specific tooling, and avoiding the expense of scrapping strips of battery grids and/or pasted strips and/or separate pasted grids or plates due to the use of incorrect tooling in machines and/or production lines or the incorrect set up of machines and production lines for the specific tooling installed therein.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A system comprising:
a machine configured for using a plurality of different tools with an electronic controller of variable operating parameters for at least two specific tools each of which are installable in the machine, and the machine is at least one of a battery grid casting, grid reforming, grid cutting, grid trimming, grid pasteing, paste ingredients mixing, drying oven, plate stacking, or robotic palletizing machine;
at least two separate and different tools for the machine;
a separate tag associated with each of the at least two tools and each tag identifying its associated tool and containing stored data of desired values for the operating parameters for the machine in which the associated tool will be used;
a reader of the tool identity and of the stored data on the tag associated with the tool; and
the electronic controller is operably associated with the reader and configured to determine whether the tool is compatible with the machine and, if not, inhibits operation of the machine with such tool and, if compatible, is configured to use the data of the tool tag read by the reader to set the desired value of the operating parameters of the machine for use of such tool.

2. The system of claim 1 wherein the tag of the tool for the machine is an RFID tag and the reader is a RFID reader of the tag.

3. The system of claim 1, which also comprises at least two separate different tools for use in at least two different machines and each having a separate tag with data identifying the tool, a separate reader associated with each one of such two different machines, and the readers communicate with the electronic controller which determines whether the tools are compatible with each other and if not provides an error signal detectable by a person.

4. The system of claim 1, which also comprises at least two separate different tools for use in at least two different machines and each with a separate tag with data identifying the tool, a separate reader associated with each one of such two different machines, and the readers communicate with the electronic controller which determines whether the tools are compatible with each other and if not inhibits operation of the machines with such tools.

5. The system of claim 4, wherein if the electronic controller determines the tools are not compatible it also actuates an error signal audible to and/or visually observable by a person.

6. The system of claim 2, which comprises at least two machines each capable of using a plurality of different tools with operating parameters of each machine being variable for use with a specific tool, a separate different tool for each machine with each tool having a separate tag containing stored data of the desired values of the operating parameters of the machine in which the tool is used, a separate reader associated with each machine for reading the data of the tool installed in such machine, and one or more electronic controllers associated with the machines and configured to use the data read by the readers to set the value of the operating parameters for use of the tools installed in the machines.

7. The system of claim 2, wherein the machine comprises a grid casting machine and the tool comprises a mold installed in the casting machine and having a tag containing stored data of at least one of the operating speed of the casting machine, temperature of molten lead supplied to the mold, rate or quantity of the molten lead supplied to the mold, desired temperature of the mold, or the temperature of a fluid for cooling grids cast by the mold.

8. The system of claim 7, which also comprises a grid trimmer machine and the tag of the mold includes stored data for the operation of the trimmer machine to trim the grid cast in the mold by the casting machine.

9. The system of claim 2, wherein the machine comprises a continuous casting machine and the tool comprises a rotary casting drum installed in the casting machine for casting a continuous strip of a plurality of connected grids with an associated tag containing stored data of desired predetermined values for at least one of speed of rotation of the drum, temperature of the lead supplied by an associated shoe to a grid cavity of the drum, rate at which molten lead is supplied to an associated shoe, predetermined temperature to which an associated shoe is heated, predetermined temperature and rate of coolant applied to the drum, or temperature of coolant cooling the continuous strip downstream of the drum.

10. The system of claim 2, wherein the machine comprises a pasteing machine for a continuous strip of a plurality of grids with a hopper with an orifice plate through which paste is disposed onto the continuous strip and into spaces between the wires of the grid, and the orifice plate has an associated tag with stored data of a predetermined desired value for at least one of an operating speed of the pasteing machine, thickness of the paste applied to the grids of the strip by the pasteing machine, rate at which the hopper dispenses paste through the orifice of the orifice plate, speed at which the pasteing machine moves the strip of grids across the orifice of the orifice plate, or overall thickness of the paste applied by the pasteing machine to the grids of the continuous strip.

11. The system of claim 10, which also comprises at least one machine downstream of the pasteing machine which operates at various speeds and the tag of the orifice plate includes predetermined data of the speed at which the downstream machine will operate and this speed data is read and used to control the speed of the downstream machine.

12. The system of claim 10, which also comprises a cutter machine downstream of the pasteing machine for cutting the pasted continuous strip into individual grids and the tag of the orifice plate contains stored data of a predetermined speed of the cutter machine, and this data is read and used to control the speed of the cutter machine.

13. The system of claim 10, which also comprises a drying oven downstream of the pasteing machine and the tag of the orifice plate includes stored predetermined data for at least one of operating temperature of the oven or speed at which pasted grids are conveyed through the oven and this data is read and used to control temperature of the oven or speed at which the pasted grids are conveyed through the oven.

14. The system of claim 10, which also comprises downstream of the pasteing machine a machine for stacking the pasted grids and the tag of the orifice plate includes predetermined data of desired values for operation of the stacking machine and this data is read and used to set values for operation of the stacker.

15. The system of claim 14, which also comprises a robot configured to place stacks of plates from the stacking machine onto a palette and the tag of the orifice plate includes predetermined data of desired values for operating parameters of the robot and this data is read and used to control the operating parameters of the robot.

16. The system of claim 10, which also comprises at least one machine downstream of the pasteing machine which is configured to use a variety of different tools and the tag of the orifice plate includes predetermined data which is read and used to determine whether the tool installed in the downstream machine is a correct tool for use with the orifice plate and, if not, inhibits operation of the pasteing machine and the downstream machine and/or provides an audible or visual indication to a person that the wrong tool has been installed in the downstream machine.

17. The system of claim 10, which also comprises a paste mixing machine and the tag of the orifice plate includes predetermined data for variable operating parameters of the paste mixing machine and the predetermined data is read and used to set the value of the variable operating parameters of the paste mixing machine for use in mixing of the ingredients of a batch of paste in the paste mixing machine.

18. The system of claim 17, which also comprises apparatus for dispensing ingredients for a batch of paste into the paste mixing machine and the tag of the orifice plate includes data of a predetermined quantity of the ingredients to be dispensed by the apparatus into the paste mixing machine for a batch of paste and the data is read and used to control the quantity of the ingredients dispensed by the apparatus into the paste mixing machine for mixing the ingredients for a batch of paste by the paste mixing machine.

* * * * *